G. G. BAYNE.
NUMBER PLATE BRACKET FOR AUTOMOBILES.
APPLICATION FILED JULY 6, 1915.
1,214,119.
Patented Jan. 30, 1917.
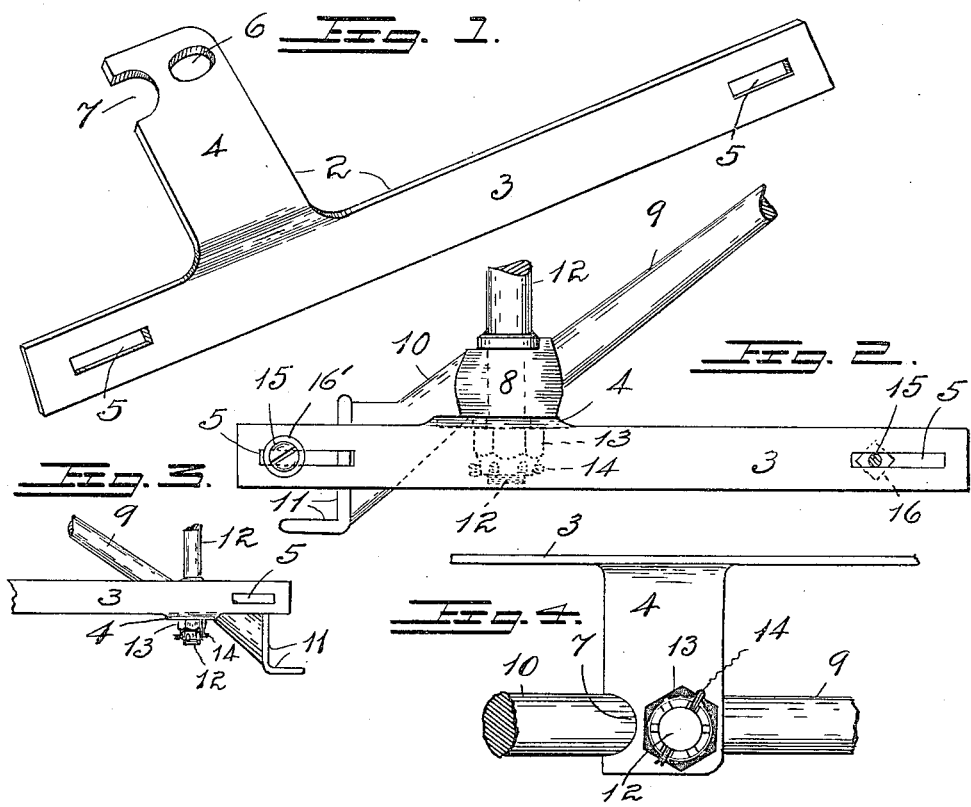

UNITED STATES PATENT OFFICE.

GEORGE G. BAYNE, OF QUINCY, ILLINOIS, ASSIGNOR TO SAFETY MANUFACTURING COMPANY, OF KANSAS CITY, MISSOURI, A CORPORATION OF MISSOURI.

NUMBER-PLATE BRACKET FOR AUTOMOBILES.

1,214,119. Specification of Letters Patent. Patented Jan. 30, 1917.

Application filed July 6, 1915. Serial No. 38,298.

*To all whom it may concern:*

Be it known that I, GEORGE G. BAYNE, a citizen of the United States, whose address is Quincy, in the county of Adams and State of Illinois, have invented a new and useful Number-Plate Bracket for Automobiles, of which the following is a specification.

My invention relates to number-plate brackets securable to the lamp and fender brackets of automobiles, whereby the number-plate may be supported. It is especially designed for Ford cars.

The principal object of the invention is to provide a simple, inexpensive bracket, the construction of which is such that it will be held very rigidly upon the car and also such that it will support and hold the number-plate with equal rigidity.

Another object is to so construct the device that it is reversible and therefore attachable to either the right or left bracket of a car.

Another object is to provide a number-plate bracket the general idea of which is such that it is capable of many modifications.

Other objects will presently appear; some of these will be obvious and others specifically pointed out.

In the accompanying drawings, illustrating the preferred and several modified types of my improvements: Figure 1 is a perspective view of a preferred embodiment of my invention. Fig. 2, a front elevation, showing the device as applied to the left front lamp and fender brackets of a Ford automobile; Fig. 3, a fragmental front elevation showing the device as applied to the opposite bracket from that shown in Fig. 2; and Fig. 4, a bottom plan of the device, shown in the same position as in Fig. 2.

Considering said drawings in detail and designating each element and part thereof by a distinguishing reference numeral, uniformly employed, 2 indicates a number-plate bracket consisting of a stamping from a piece of sheet metal and comprising an elongated bar 3 having a supporting-plate 4 bent rearwardly. The bar is provided with slots 5 and the plate with an aperture 6 and a recess or cutaway portion 7.

In Fig. 2 the device just described is shown as applied to the left hand lamp and fender brackets of a Ford automobile, and in Fig. 3 it is shown as reversed or turned upside down and applied to the opposite or right hand brackets. In these figures 8 designates the centrally arranged apertured boss of the fender-bracket, 9 indicates the fender-supporting arm, and 10 the lower arm, the angle 11 of which fits against the chassis. 12 indicates the lamp-supporting arm or bracket the lower end of which is threaded, passes through the aperture 6 in the number-plate bracket, and is engaged by a nut 13 which is retained in place by a cotter 14. The parts numbered 8 to 14 inclusive are those of a Ford automobile and require herein no further description, and except that they enter into combinations therewith, form no part of my improvements.

The securement of the device 2 by reason of the passage of the lamp-bracket bolt therethrough, and locking it by means of the nut 13, would of course retain it securely thereon, but this is not sufficient for the best results, so I have provided the supporting-plate 4 with the recess 7 in which the lower arm 10 of the automobile bracket snugly fits when the bracket is slid into place, whereby to prevent even the slightest movement of the device 2 and thereby the number-plate, (not shown,) which is secured to the bar 3 by means of bolts 15 passed through the slots 5 and engaged by nuts 16. 16′ designates a washer.

It has not been thought either necessary or best to encumber this specification and the accompanying drawings with descriptions and illustrations of modifications which are not essential to the invention, considered in its broadest aspect. In fact, it is apparent without such disclosures that numerous modifications may be made without departing from the scope of the invention as claimed.

Therefore, without limiting myself to particularities I claim as new the following, to-wit:

A number-plate bracket formed from a sheet of metal and comprising an elongated bar having intermediate its ends a supporting projection, said projection turned at a right angle to the face and from the edge of the bar and having near its terminal a perforation and a recess, the latter cut in one of its lateral edges.

In testimony whereof I hereunto affix my signature, at Quincy, Adams county, Illinois, this 1st day of July, 1915.

GEORGE G. BAYNE.

Copies of this patent may be obtained for five cents each, by addressing the "Commissioner of Patents, Washington, D. C."